(12) United States Patent
Jung et al.

(10) Patent No.: US 9,043,063 B2
(45) Date of Patent: May 26, 2015

(54) ANTI-NOSE DOWN TORQUE CONTROL SYSTEM AND METHOD FOR VEHICLE

(71) Applicants: Hyundai Motor Company, Seoul (KR); Kia Motors Corporation, Seoul (KR)

(72) Inventors: Jae Won Jung, Seoul (KR); Seong Woong Suh, Gyeonggi-do (KR); Hyo Jin Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 48 days.

(21) Appl. No.: 13/954,056

(22) Filed: Jul. 30, 2013

(65) Prior Publication Data

US 2014/0188317 A1    Jul. 3, 2014

(30) Foreign Application Priority Data

Dec. 31, 2012  (KR) .......................... 10-2012-0157805

(51) Int. Cl.
| | |
|---|---|
| *B60W 10/08* | (2006.01) |
| *B60W 30/18* | (2012.01) |
| *B60W 10/18* | (2012.01) |
| *G06F 19/00* | (2011.01) |

(52) U.S. Cl.
CPC ......... *B60W 30/18109* (2013.01); *B60W 10/08* (2013.01); *B60W 10/18* (2013.01); *B60W 2600/00* (2013.01); *Y02T 10/7005* (2013.01); *Y02T 10/7275* (2013.01)

(58) Field of Classification Search
CPC ..... B60W 10/18; B60W 10/14; B60W 10/16; B60W 10/192; G01P 15/00; B60T 2240/00
USPC ................... 701/22, 70, 41, 48; 180/197, 282
See application file for complete search history.

(56) References Cited

U.S. PATENT DOCUMENTS

| | | | |
|---|---|---|---|
| 2012/0150384 A1* | 6/2012 | Jung et al. ..................... | 701/31.1 |
| 2013/0080013 A1* | 3/2013 | Kobayashi et al. ............. | 701/70 |
| 2013/0166165 A1* | 6/2013 | Murata et al. ................... | 701/70 |

FOREIGN PATENT DOCUMENTS

| | | | |
|---|---|---|---|
| JP | 2004166363 A | | 6/2004 |
| JP | 2005-348497 A | | 12/2005 |
| JP | 2006304599 A | | 11/2006 |
| JP | 2007124868 A | | 5/2007 |
| JP | 2007216737 A | | 8/2007 |
| KR | 10-2005-0048009 | | 5/2005 |
| KR | 10-2012-0061413 | | 6/2012 |

* cited by examiner

*Primary Examiner* — Tan Q Nguyen
(74) *Attorney, Agent, or Firm* — Mintz Levin Cohn Ferris Glovsky and Popeo, P.C.; Peter F. Corless

(57) ABSTRACT

An anti-nose down torque control system and method for a vehicle is provided that prevents a nose down phenomenon where, during braking of a vehicle, front parts of the vehicle rotates forward. The method includes braking, by a controller, the vehicle being driven by a motor and applying the anti-nose down torque in a forward direction to the motor in response to a deceleration and a vehicle speed in a last braking stage. In addition, the controller is configured to decrease a braking deceleration and reduce a nose down phenomenon by the anti-nose down torque.

9 Claims, 4 Drawing Sheets

ANTI-NOSE DOWN TORQUE CONTROL SYSTEM AND METHOD FOR VEHICLE

CROSS-REFERENCE TO RELATED APPLICATION

This application claims under 35 U.S.C. §119(a) the benefit of Korean Patent Application No. 10-2012-0157805, filed on Dec. 31, 2012, the entire contents of which are incorporated herein by reference.

BACKGROUND (a) Technical Field

The present invention relates to an anti-nose down torque control system and method for a vehicle, and more particularly, to an anti-nose down torque control system and method for a vehicle that prevents a nose down phenomenon during which braking of electric vehicles including fuel cell vehicles causes front parts of the vehicles to rotate forward.

(b) Background Art

In general, when a braking operation is performed during vehicle driving, a phenomenon wherein a front part of the vehicle rotates forward due to deceleration in response to the braking of the vehicle, what is called, a nose down phenomenon occurs, and the nose down phenomenon occurs because braking force is applied rearward to a tire tread lower than a center of gravity of the vehicle.

In other words, when the brakes of the vehicle are engaged, an inertial force is applied to the center of gravity of the vehicle in a progress direction of the vehicle, and the braking force is generated at the wheel in a reverse direction, causing a rotational moment applied to the vehicle, in which case the nose down phenomenon where the front part of the vehicle rotates forward occurs.

In particular, a fuel cell vehicle or an electric vehicle has no engine unlike a vehicle with an internal combustion engine such that the center of gravity thereof is biased forward to an upper part of the vehicle based on layout design as compared with an engine vehicle, and has no idle state torque unlike the engine vehicle, in which case the nose down phenomenon occurrence may increase shortly before the vehicle is stopped.

SUMMARY

The present invention provides an anti-nose down torque control system and method for a vehicle in which during a last braking stage of a fuel cell vehicle or an electric vehicle in which a motor is loaded as a drive source, a forward direction torque referred to as an anti-nose down torque may be applied to the motor to decrease a braking deceleration, thus alleviating a nose down phenomenon of the vehicle.

In accordance with an aspect of the present invention, an anti-nose down torque control method for a vehicle may include: braking the vehicle being driven by a motor; applying the anti-nose down torque in a forward direction to the motor in response to a deceleration and a vehicle speed in a last braking stage; and decreasing a braking deceleration and reducing a nose down phenomenon by the anti-nose down torque.

In one embodiment of the present invention, applying the anti-nose down torque to the motor may include: applying the anti-nose down torque to the motor; calculating a maximum value of the anti-nose down torque from a braking deceleration-torque map; determining the anti-nose down torque using a motor rotating speed-torque map that indicates the calculated maximum value of the anti-nose down torque and a torque zero point versus a motor rotating speed; and applying the determined anti-nose down torque to the motor.

In another embodiment of the present invention, in braking of the vehicle, the anti-nose down torque may gradually increase from zero as a rotating speed of the motor decreases from a first predetermined speed, and may remain at a maximum value until the vehicle is stopped from a second predetermined speed less than the first predetermined speed.

In a further embodiment of the present invention, the deceleration may become zero immediately after the vehicle is stopped causing the anti-nose down torque to disappear.

According to embodiments of the present invention, in braking of the fuel cell vehicle or the electric vehicle in which the motor is loaded as the drive source, the forward direction torque referred to as the anti-nose down torque may be applied to the motor causing the nose down phenomenon of the vehicle to be alleviated. In other words, in the last braking stage, the anti-nose down torque may slowly increase, and the maximum value of the anti-nose down torque may be applied to the motor at the predetermined speed or lower to decrease the braking deceleration, which may alleviate the nose down phenomenon of the fuel cell vehicle and the electric vehicle.

BRIEF DESCRIPTION OF THE DRAWINGS

The above and other features of the present invention will now be described in detail with reference to exemplary embodiments thereof illustrated the accompanying drawings which are given hereinafter by way of illustration only, and thus are not limitative of the present invention, and wherein.

Figure 1:
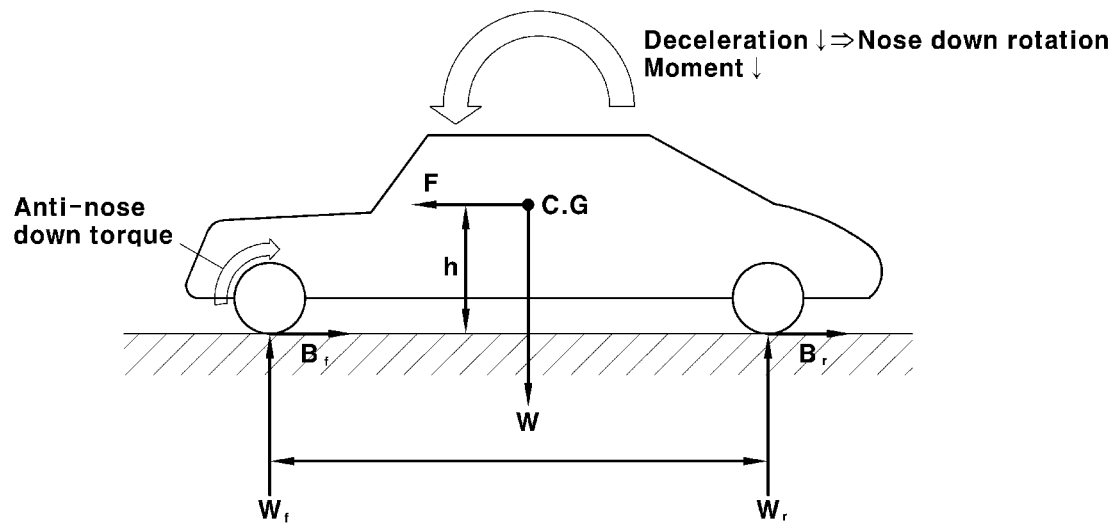
FIG. 1 is an exemplary view showing an anti-nose down torque applying direction of a vehicle according to an exemplary embodiment of the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, fuel cell vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings.

The present invention places an emphasis on the fact that during braking of a fuel cell vehicle and an electric vehicle in which a motor is loaded as a drive source, a forward direction torque referred to as anti-nose down torque may be applied to the motor to alleviate a nose down phenomenon during which a vehicle body rotates forward.

In general, in a fuel cell vehicle and an electric vehicle, a center of gravity of the vehicle is biased forward to an upper part of the vehicle as compared with engine vehicle, and there is no idle state torque unlike an engine vehicle, in which case the nose down phenomenon occurrence increases shortly before the vehicle is stopped. Therefore, when the vehicle brakes are engaged, the forward direction torque referred to as the anti-nose down torque may be applied to the motor in response to a deceleration and a vehicle speed in a last braking stage to prevent the occurrence of the nose down phenomenon. In this way, as the anti-nose down torque is applied to the motor to decrease braking deceleration, the nose down phenomenon may be alleviated.

Hereinafter, a process of calculating, by a controller, the anti-nose down torque and applying the anti-nose torque to the motor during braking of the vehicle will be described in more detail.

Figure 2:
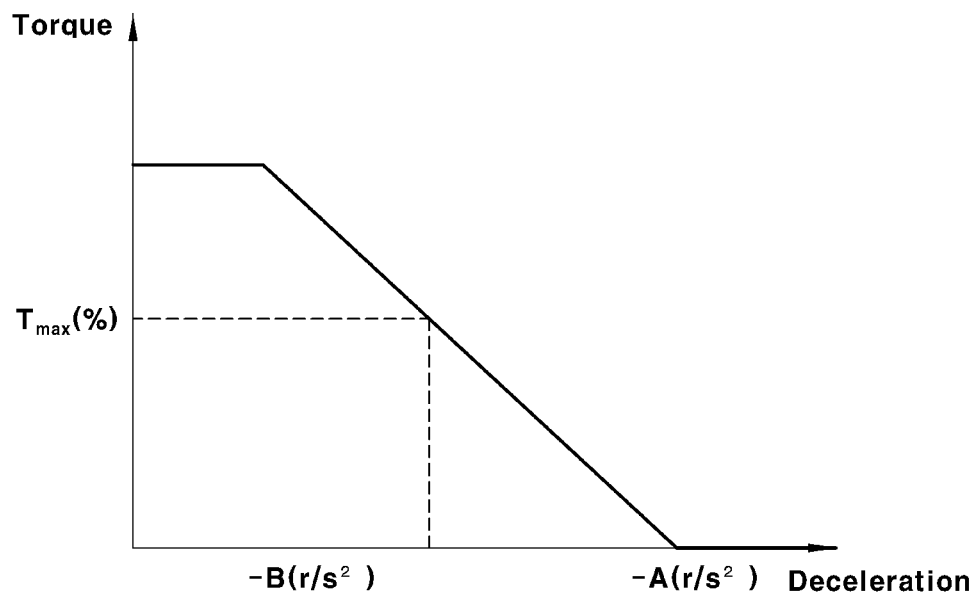
FIG. 2 is an exemplary primary deceleration-torque map for determining the anti-nose down torque according to an embodiment of the present invention.

First, a maximum value of the anti-nose down torque may be calculated by the controller from a stored braking deceleration-torque map. As shown in FIG. 2, the braking deceleration-torque map corresponds to a data map in which the anti-nose down torque capable of alleviating the nose down for the deceleration through a vehicle test may be calculated, and the maximum value (T %) of the anti-nose down torque in response to a current deceleration may be calculated by the controller from this map during braking of the vehicle.

Figure 3:
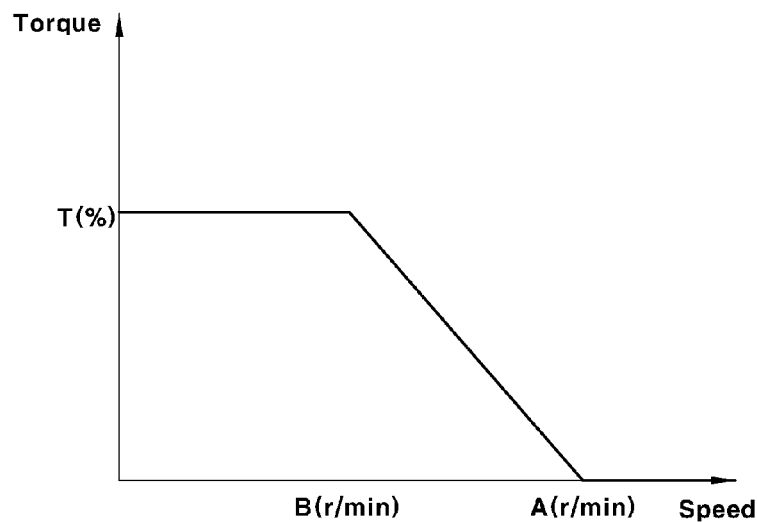
FIG. 3 is an exemplary secondary motor rotating speed-torque map for determining the anti-nose down torque according to the embodiment of the present invention.

Thereafter, as shown in FIG. 3, a torque curve of a motor rotating speed-torque map may be determined by the controller using the calculated maximum value (T %) of the anti-nose down torque. In other words, in FIG. 3, an X axis indicates a variation of the motor rotating speed during vehicle braking, a Y axis indicates the anti-nose down torque from a zero point to a maximum value, and the torque curve has a characteristic of gradually increasing from the zero point to the maximum value (T %) of the anti-nose down torque at a constant speed and remaining at the maximum value (T %).

Accordingly, in the last braking stage, the anti-nose down torque may be determined by the controller using the motor rotating speed-torque map, that is, the motor rotating speed-torque map of the maximum value of the anti-nose down torque and the torque zero point versus the motor rotating speed, and the determined anti-nose down torque may be applied to the motor.

In particular, an anti-nose down torque control by which, during the vehicle braking, the anti-nose down torque gradually increases from the zero as the motor rotating speed decreases from a first predetermined speed, and remains at the maximum value until the vehicle is stopped from a second predetermined speed less than the first predetermined speed is performed.

In an embodiment of the present invention, as shown in the motor rotating speed-torque map of FIG. 3, the anti-nose down torque control by which when the anti-nose down torque begins to gradually increase from the zero as the motor rotating speed decreases from the first predetermined speed (A: e.g., about 600 r/min) and reaches the maximum value of the anti-nose down torque, which may be calculated by the controller using the deceleration-torque map, at the second predetermined speed (B: e.g., 300 r/min) during the vehicle braking may be performed, the maximum value (T %) of the anti-nose down torque may be maintained until the vehicle is stopped.

Figure 4:
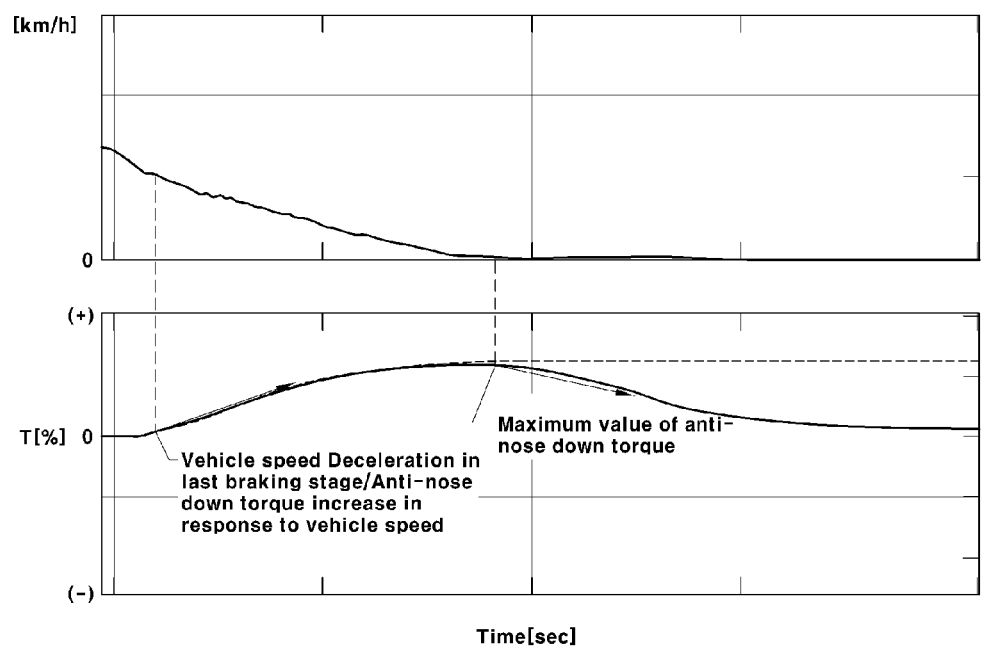
FIG. 4 is an exemplary operation profile of the anti-nose down torque according to the embodiment of the present invention.

Moreover, as in FIG. 4 that illustrates an operation profile for the vehicle speed versus the anti-nose down torque, it may be seen that in the last braking stage, the anti-nose down torque in response to the deceleration, the vehicle speed slowly increases to reach the maximum value. In particular, in the last braking stage, the anti-nose down torque may slowly increase, and the maximum value of the anti-nose down torque may be applied to the motor at the predetermined speed or lower to decrease the braking deceleration, which may alleviate the nose down phenomenon of the fuel cell vehicle and the electric vehicle, and accordingly may enhance riding quality during braking.

Figure 5:
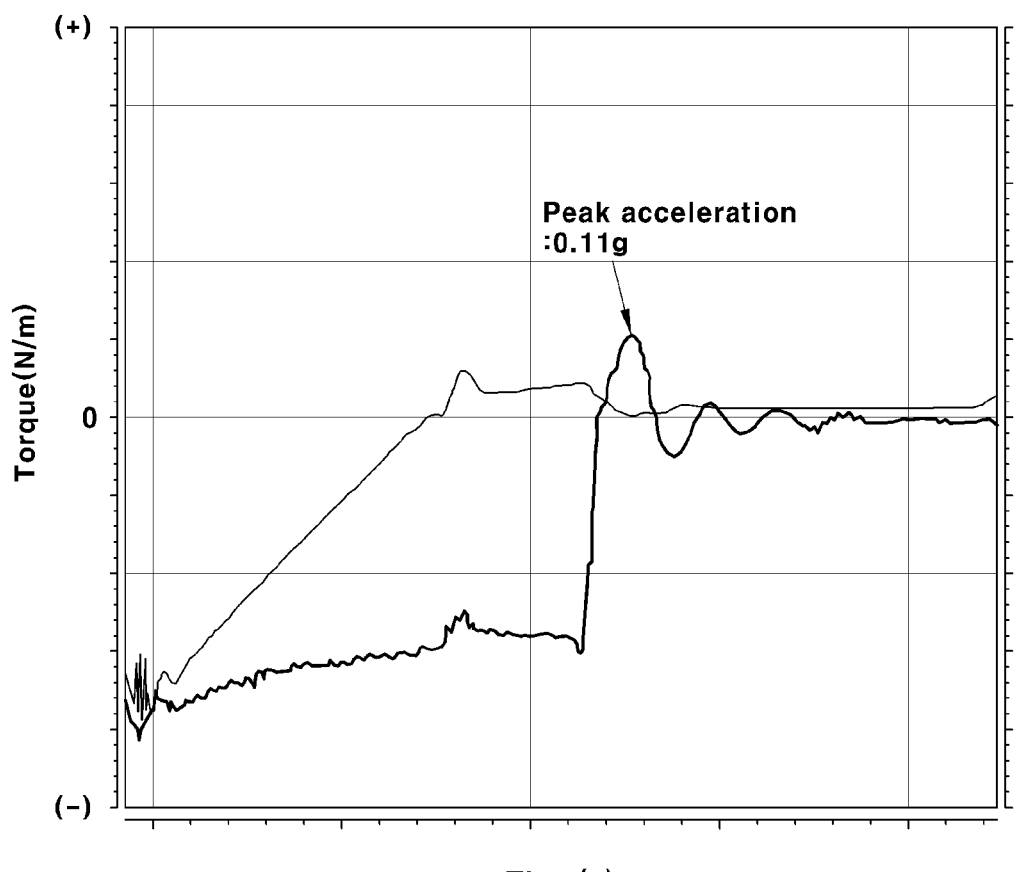
FIGS. 5 and 6 are exemplary graphs illustrating variations of torque, deceleration, and acceleration before and after application of the anti-nose down torque according to an exemplary embodiment of the present invention.
Figure 6:
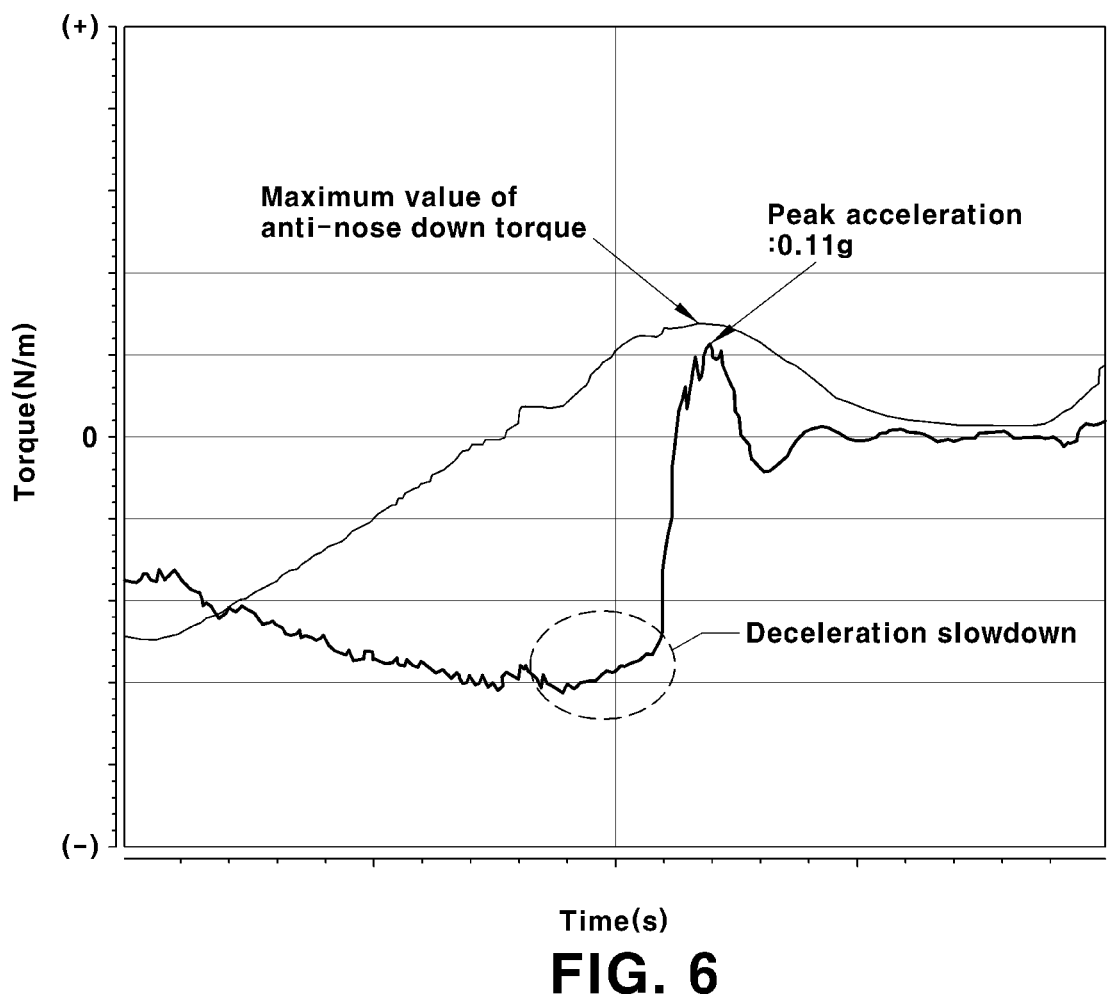

As shown in a diagram of the torque and the deceleration before application of the anti-nose down torque of FIG. 5, a peak acceleration (e.g., about 0.11 g) operates to cause the nose down phenomenon to occur at a time point when the vehicle brakes are engaged and the vehicle is stopped. However, as shown in a diagram of the torque and the deceleration before application of the anti-nose down torque of FIG. 6, even when the peak acceleration (e.g., about 0.11 g) operates at the time point when the vehicle brakes are engaged and the vehicle stopped, the anti-nose down torque may operate at the same braking time point to alleviate the nose down phenomenon.

Moreover, it may be seen from the figures that after being compared with before the application of the anti-nose down torque, a deceleration slowdown effect is observed in the last braking stage, and shock vibration due to the peak acceleration at a stop time point may be more rapidly damped, making it possible to enhance the riding quality during braking of the vehicle.

Meanwhile, since the deceleration becomes zero (0) immediately after the stop in response to the braking of the vehicle, the anti-nose down torque may be minimally decreased to disappear.

Although the invention has been described in detail with reference to exemplary embodiment thereof, it will be appreciated by those skilled in the art that the embodiment may be modified without departing from the principle and spirit of the invention, the scope of which is defined in the accompanying claims and their equivalents.

What is claimed is:

1. An anti-nose down torque control method for a vehicle, comprising:
   braking, by a controller, the vehicle being driven by a motor;
   applying, by the controller, the anti-nose down torque in a forward direction to the motor in response to a deceleration and a vehicle speed in a last braking stage; and
   decreasing, by the controller, a braking deceleration and reducing a nose down phenomenon by the anti-nose down torque, wherein the applying of the anti-nose down torque to the motor includes;
      applying, by the controller, the anti-nose down torque a the moter;
      calculating, by the controller, a maximum value of the anti-nose down torque from a braking deceleration-torque map;
      determining, by the controller, the anti-nose down torque using a motor rotating speed-torque map that indicates the calculated maximum value of the anti-nose down torque and a torque zero point versus a motor rotating speed; and
      applying, by the controller, the determined anti-nose down torque to the motor.

2. The anti-nose down torque control method of claim 1, wherein during braking of the vehicle, the anti-nose down torque gradually increases from zero as a rotating speed of the motor decreases from a first predetermined speed, and remains at a maximum value until the vehicle is stopped from a second predetermined speed less than the first predetermined speed.

3. The anti-nose down torque control method of claim 1, wherein the deceleration becomes zero after the vehicle is stopped causing the anti-nose down torque to disappear.

4. An anti-nose down torque control system, comprising:
   a controller configured to:
      brake the vehicle being driven by a motor;
      apply the anti-nose down torque in a forward direction to the motor in response to a deceleration and a vehicle speed in a last braking stage;
      decrease a braking deceleration and reducing a nose down phenomenon by the anti-nose down torque;
      apply the anti-nose down torque to the motor;
      calculate a maximum value of the anti-nose down torque from a braking deceleration-torque map;
      determine the anti-nose down torque using a motor rotating speed-torque map that indicates the calculated and a torque zero point versus a motor rotating speed; and
      apply the determined anti-nose down torque to the motor.

5. The anti-nose down torque control system of claim 4, wherein during braking of the vehicle, the anti-nose down torque gradually increases from zero as a rotating speed of the motor decreases from a first predetermined speed, and remains at a maximum value until the vehicle is stopped from a second predetermined speed less than the first predetermined speed.

6. The anti-nose down torque control system of claim 4, wherein the deceleration becomes zero after the vehicle is stopped causing the anti-nose down torque to disappear.

7. A non-transitory computer readable medium containing program instructions executed by a processor or controller, the computer readable medium comprising;
   program instructions that brake the vehicle being driven by a motor;
   program instructions that apply the anti-nose down torque in a forward direction to the motor in response to a deceleration and a vehicle speed in a last braking stage;
   program instructions that decrease a braking deceleration and reducing a nose down phenomenon by the anti-nose down torque;
   program instruction that apply the anti-nose down torque to motor;
   program instruction that calculate a maximum value of the anti-nose down torque from a braking deceleration-toque map;
   program instruction that determine the anti-nose down torque using a motor rotating speed-torque map that indicates the calculate maximum value of the anti-nose down torque and a torque zero point versus a motor rotating speed; and
   program instructions that apply the derermined anti-nose down torque to the motor.

8. The non-transitory computer readable medium of claim 7, wherein during braking of the vehicle, the anti-nose down torque gradually increases from zero as a rotating speed of the motor decreases from a first predetermined speed, and remains at a maximum value until the vehicle is stopped from a second predetermined speed less than the first predetermined speed.

9. The non-transitory computer readable medium of claim 7, wherein the deceleration becomes zero after the vehicle is stopped causing the anti-nose down torque to disappear.

* * * * *